United States Patent [19]

Todoko et al.

[11] Patent Number: 4,508,877

[45] Date of Patent: Apr. 2, 1985

[54] PROCESS FOR PRODUCING A HIGH PURITY CYCLIZED POLYMER OF ISOPRENE

[75] Inventors: Masaaki Todoko; Hiroyuki Watanabe, both of Yamaguchi, Japan

[73] Assignee: Toyo Soda Manufacturing Co., Ltd., Shinnanyo, Japan

[21] Appl. No.: 554,299

[22] Filed: Nov. 22, 1983

[30] Foreign Application Priority Data

Nov. 26, 1982 [JP] Japan .................................. 57-206049

[51] Int. Cl.$^3$ ................................................ C08F 8/48
[52] U.S. Cl. .............................. 525/333.1; 525/359.3
[58] Field of Search ......................... 525/333.1, 359.3

[56] References Cited

U.S. PATENT DOCUMENTS 2,661,340  12/1953  Van Veerson ................... 525/333.1
3,245,974  4/1966   Angelo ............................ 525/333.1

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

A process for producing cyclized isoprene polymers having a dispersion degree not higher than 2, which comprises living-polymerizing isoprene monomers using as initiator an organometal compound which is expressed by a general formula RM (where R is alkyl, aryl or aralkyl group and M is lithium, sodium or potassium atom), to obtain an isoprene polymer having a dispersion degree not larger than 1.1, which is close to a unit dispersion, and bringing the obtained polymer into contact with a catalyst composed of a boron trifluoride-ether complex and a carboxylic acid expressed by a general formula $Cl_{3-n}H_nCCOOH$ (where n is an integer ranging from 0 to 3) under a mild condition. The cyclized polymer is very useful for negative resists in integrated circuits.

11 Claims, No Drawings

PROCESS FOR PRODUCING A HIGH PURITY CYCLIZED POLYMER OF ISOPRENE

BACKGROUND OF THE INVENTION

1. Field of the Invention

The present invention relates to a process for producing a cyclized polymer of isoprene having a dispersion degree not greater than 2 as defined as the ratio of $\overline{Mw}/\overline{Mn}$, where $\overline{Mw}$ and $\overline{Mn}$ are the weight-average and the number-average molecular weights, respectively.

More particularly, the present invention relates to a process for producing a cyclized polymer of isoprene having a dispersion degree not greater than 2, comprising polymerizing isoprene monomers in the presence of an organometallic compound expressed by a general formula RM, where R is alkyl, aryl or aralkyl group and M is lithium, sodium or potassium atom, and bringing the obtained polymer of a low dispersion degree into contact with a catalyst which comprises a boron trifluoride-ether complex and a carboxylic acid expressed by a general formula $Cl_{3-n}H_nCCOOH$, where n is an integer ranging from 0 to 3.

Cyclized compounds of natural or synthetic rubbers have been most widely used as a negative resist substance, which becomes insoluble in solvents on irradiation with light, due to the crosslinkage formed between high polymer chains.

Among various properties of the resist substances, two particularly important properties are sensitivity and resolution. With improvements recently made in the integration degree of integrated circuits, increasing demands have been made for a higher resolution degree of the resist substances. Today, materials are in particular demand which permit a microprocessing precision of 1 μm or less.

2. Description of Prior Arts

The conventional rubber resist materials mentioned above have presented problems with respect to their resolution ability, and their dimensional accuracy limit which is practically laid at about 3 μm. Thus, the conventional materials cannot meet the requirements of the production processes of integrated circuits of higher integration degree, which require a precision accuracy of less than 3 μm.

The conventional rubber resists, whether of natural or synthetic rubbers, have a wide distribution of molecular weights, and their dispersion degree as defined as a ratio of $\overline{Mw}/\overline{Mn}$ is usually greater than 2 or 3, where $\overline{Mw}$ and $\overline{Mn}$ are the weight-average and number-average molecular weights, respectively.

Conventional methods for cyclization of diene polymers include:

(1) a method using sulfuric or sulfonic acid;
(2) a method using the Friedel-Crafts' catalyst, such as $SnCl_4$, $TiCl_4$ and $FeCl_3$;
(3) a method using a hydrogen halogenide, such as hydrogen chloride;
(4) a method using a phosphorus compound, such as phosphorus pentachloride and phosphorus oxychloride; and
(5) a method using a cationic polymerization initiator, such as a catalyst composed of trichloroacetic acid and either of diethyl aluminum chloride and ethyl aluminum dichloride.

According to these conventional methods, however, reactions such as gel formation occur among high molecular chains, and it is difficult to selectively enforce the cyclization reaction in molecules.

SUMMARY OF THE INVENTION

The present inventors, after extensive investigations to overcome difficulties encountered with by the conventional rubber resists, particularly with cyclized isoprene polymers, have completed the present invention.

The present inventors paid attention to the molecular characteristics, particularly the molecular weight dispersion of the conventional rubber resists, and have reached at cyclization of isoprene polymers having a dispersion degree close to unity under a condition that the molecular weight distribution is not disordered, so as to successively obtain a cyclized isoprene polymer having an excellent resolution ability.

This invention is characterized by the cyclization reaction which is carried out almost without any substantial change in the molecular weight distribution of the polymer.

The present inventors have completed a process for producing cyclized isoprene polymers with a dispersion degree not higher than 2, which comprises living-polymerizing isoprene monomers using as initiator an organometal compound which is expressed by a general formula RM (where R is alkyl, aryl or aralkyl group and M is lithium, sodium or potassium atom), to obtain an isoprene polymer having a dispersion degree not larger than 1.1, which is close to a unit dispersion, and bringing the obtained polymer into contact with a catalyst composed of a boron trifluoride-ether complex and a carboxylic acid expressed by a general formula $Cl_{3-n}H_nCCOOH$ (where n is an integer ranging from 0 to 3) under a mild condition.

DETAILED DESCRIPTION OF THE INVENTION

The present invention will be described in more detail with respect to the individual steps.

In the step of operation in which isoprene monomers are polymerized, organometal compounds as initiator in the living-polymerization reaction, expressed by a general formula RM (where R is alkyl, aryl or aralkyl group and M is lithium, sodium or potassium atom), include, for example, butyl-lithium, sodium-naphthalene, sodium-anthracene, sodium-biphenyl, phenyl isopropyl-potassium, α-methylstyrene-tetramer-potassium. Among them, however, most preferable is butyl-lithium.

Selection of the solvent for polymerization is important in view of the microstructure of diene polymers to be formed. For example, it is known that, when butyl-lithium is used as initiator, hydrocarbon solvents, such as hexane, cyclohexane, benzene, toluene, and xylene tend to selectively form 1,4-addition polymers, while ether solvents, such as tetrahydrofurane, tetrahydropyrane and dioxane tend to form 1,2- or 3,4-addition polymers.

For solvents to be used in the present invention, hydrocarbon solvents with which isoprene monomers selectively produce 1,4-addition polymers, such as, for example, hexane, cyclohexane, benzene, toluene and xylene may be employed. Among them, however, particularly preferable are benzene, toluene and xylene.

No particular restriction is placed on the molecular weight of isoprene polymers in this invention. However, in view of the fact that the sensitivity of resist materials formed from the polymers depends on the molecular weight, the polymerization reaction are preferably performed under such conditions to give a molecular weight not less than 10,000, preferably not less than 20,000.

As the catalyst used in the cyclization step of operation, a catalyst composed of a boron trifluoride-ether complex and a carboxylic acid expressed by a general formula $Cl_{3-n}H_nCCOOH$, where n is an integer ranging from 0 to 3, may be used. The carboxylic acids may include acetic, monochloroacetic, dichloroacetic and trichloroacetic acids. However, most preferable is trichloroacetic acid.

For solvents in this step, aromatic hydrocarbons such as benzene, toluene and xylene may be used.

The concentration of the polymers used in this step, though it depends on the molecular weight of the polymers, may be between 0.5 and 15% by weight, preferably between 0.5 and 10% by weight. When the reaction is carried out with a concentration greater than 15% by weight, undesirable reactions, such as formation of gels may be introduced.

The concentration of the boron trifluoride-ether complex should be between 0.1 to 20% in the monomer unit moles against the polymers. The most preferable concentration lies between 1 to 10% by moles. Meanwhile, the concentration of the carboxylic acid should be 10 to 500% by moles, preferably 20 to 300% by moles.

The cyclization reaction temperature is particularly important in connection to the dispersion degree of resultant cyclized polymers. At temperatures of 10° C. and lower, intermolecular reactions and gel-forming reactions may occur. On the other hand, at temperatures of 80° C. and higher, cyclized substances may be produced having a wide range of molecular weight distribution. Therefore, the cyclization reaction should be performed between 10° and 80° C., preferably between 20° and 60° C.

The above cyclization reaction proceeds without any difficulty even in the presence of not larger than 0.2% by weight of alcohol, such as, for example, methanol and ethanol in the reaction solution. Thus, in the polymerization step of operation, the living polymerization is carried out using benzene as solvent and, without isolating and purifying the produced polymer, methanol or ethanol as terminator is added to the reaction system, and then a certain amount of benzene solution is added to adjust the concentration. In such cases, the cyclization reaction proceeds without any trouble.

There is no particular limitation on the rate of cyclization of the polymers. However, since the sensitivity of resist materials depends on the rate of cyclization of polymer, the rate of cyclization should be between 40 and 90%, preferably between 50 and 80%.

The present invention provides a process for easily producing under a mild condition cyclized polymers of isoprene having a rather narrow range of molecular weight distribution, which are very advantageous to a negative photoresist material to be used with benefit for the production of integrated circuits of higher integration degree.

DESCRIPTION OF PREFERRED EMBODIMENTS

The present invention will be better understood from the following description of preferred embodiments.

EXAMPLE 1

An isoprene monomer in an amount of 52 g, carefully dried under a vacuum of $10^{-5}$ mmHg, was mixed with 515 ml of benzene. While the mixture was being stirred, 4.45 ml of a hexane solution of n-butyl-lithium (0.165 mol/l) was dropwise added at room temperature. After additional stirring for 3 hours, the reaction product was poured into ethanol, to recover the polymer formed. The rate of polymerization was 100%. Microstructure of the resultant isoprene polymer was estimated by NMR and the percentage distributions of 1,4-, 3,4- and 1,2-adducts were found 94, 6 and 0%, respectively. Molecular weight of the polymer was $7.6 \times 10^4$ as determined by the light scattering method. The molecular weight distribution determination by the ultracentrifuge sedimentation speed method gave a dispersion degree of 1.02 and this confirmed the resultant polymer was almost of unit dispersion.

10 g of the polymer thus obtained was dissolved in 500 ml of benzene, and 0.72 g of trichloroacetic acid was added thereto in a nitrogen atmosphere. After the mixing was completed, 0.6 ml of boron trifluoride-ether complex was added in drops. In an hour of stirring, 10 ml of methanol was added to the mixture to stop the reaction. The reaction mixture was poured into methanol to obtain a cyclized polymer of isoprene.

The cyclization degree of the cyclized polymer as estimated by the NMR measurement was 76%. Molecular weight distribution determination by the ultracentrifuge sedimentation speed gave a dispersion degree ($\overline{M}w/\overline{M}n$) of 1.30. Further, the gel permuation chromatography (hereinafter designated as GPC) proved no formation of intermolecular compounds and gels.

EXAMPLES 2 TO 4

Isoprene monomers were polymerized by the same process as in Example 1 by adding a predetermined amount of n-butyl-lithium as initiator. Then the reaction was stopped by adding methanol to the reaction mixture 5 times as much in moles as that of the initiator. To the resultant solution, BHT as stabilizer for the polymer was added in an amount of 5 parts by weight per 100 parts of the polymer. To 100 ml of the polymer solution, 400 ml of benzene was added to make 2% by weight concentration of the polymer, and then the cyclization reaction was carried out in the same way as in Example 1. Results are shown in Table 1.

TABLE 1

|  | Isoprene Polymer | | | | | Cyclized Polymer | |
| --- | --- | --- | --- | --- | --- | --- | --- |
|  | Molecular Weight | Microstructure (%) | | | Degree of Dispersion | Degree of Cycliza- | Degree of Dispersion |
| Example | ($\times 10^4$) | 1,4- | 3,4- | 1,2- | ($\overline{M}w/\overline{M}n$) | tion (%) | ($\overline{M}w/\overline{M}n$) |
| 2 | 2.1 | 96 | 4 | 0 | 1.01 | 74 | 1.24 |
| 3 | 7.6 | 95 | 5 | 0 | 1.04 | 74 | 1.38 |

TABLE 1-continued

| | Isoprene Polymer | | | | Cyclized Polymer | |
|---|---|---|---|---|---|---|
| Example | Molecular Weight ($\times 10^4$) | Microstructure (%) 1,4- | 3,4- | 1,2- | Degree of Dispersion ($\overline{M}w/\overline{M}n$) | Degree of Cyclization (%) | Degree of Dispersion ($\overline{M}w/\overline{M}n$) |
| 4 | 13.5 | 93 | 5 | 2 | 1.06 | 70 | 1.42 |

EXAMPLES 5 TO 9

Using the isoprene polymer prepared in Example 3, the same procedure as in Example 1 was followed except that the reaction temperature was changed. Results are shown in Table 2.

TABLE 2

| Example | 5 | 6 | 7 | 8 | 9 |
|---|---|---|---|---|---|
| Reaction Temperature (°C.) | 5 | 18 | 30 | 50 | 80 |
| Degree of Cyclization (%) | Gel Formation | 57 | 72 | 80 | 87 |
| Degree of Dispersion ($\overline{M}w/\overline{M}n$) | — | 1.30 | 1.33 | 1.42 | 2.13 |

EXAMPLES 10 TO 14

Using solutions of isoprene polymers prepared in Example 3 and varying the concentrations of the polymer solutions, the same process as in Example 1 was followed to bring about cyclization reactions, except that boron trifluoride-ether complex and trichloroacetic acid as catalyst were added each in an amount of 6% to the polymer in monomer unit moles. Results obtained are shown in Table 3.

TABLE 3

| Example | 10 | 11 | 12 | 13 | 14 |
|---|---|---|---|---|---|
| Concentration of Polymer (% by weight) | 1 | 2 | 4 | 8 | 16 |
| Degree of Cyclization (%) | 72 | 72 | 71 | 75 | Gel Formation |
| Degree of Dispersion ($\overline{M}w/\overline{M}n$) | 1.28 | 1.30 | 1.33 | 1.37 | — |

EXAMPLES 15 TO 19

In the same method as in Example 3, except that the ratio of the two catalyst components was varied, the cyclization reaction was carried out, and results are shown in Table 4.

TABLE 4

| Example | 15 | 16 | 17 | 18 | 19 |
|---|---|---|---|---|---|
| BF$_3$OEt$_2$ (m mol) | 8.51 | 8.57 | 8.57 | 8.57 | 8.57 |
| Cl$_3$CCOOH (m mol) | 2.86 | 4.29 | 8.56 | 17.1 | 25.7 |
| Degree of Cyclization (%) | 52 | 61 | 75 | 77 | 72 |
| Degree of Dispersion ($\overline{M}w/\overline{M}n$) | 1.30 | 1.31 | 1.33 | 1.32 | 1.33 |

EXAMPLES 20 TO 22

The cyclization reaction was carried out in the same method as in Example 3 except that the amount of catalyst was varied. Results are shown in Table 5.

TABLE 5

| Example | 20 | 21 | 22 |
|---|---|---|---|
| BF$_3$OEt$_2$ (m mol) | 1.43 | 4.29 | 14.3 |
| Cl$_3$CCOOH (m mol) | 1.43 | 4.29 | 14.2 |
| Degree of Cyclization (%) | Rubber | 51 | 84 |
| Degree of Dispersion ($\overline{M}w/\overline{M}n$) | — | 1.27 | 1.34 |

EXAMPLES 23 TO 25

The cyclization reaction was carried out in the same method as in Example 3 except that various carboxylic acids were used. Results obtained are shown in Table 6.

TABLE 6

| Example | 23 | 24 | 25 |
|---|---|---|---|
| Carboxylic Acid | Acetic | Monochloroacetic | Dichloroacetic |
| Degree of Cyclization (%) | 54 | 66 | 71 |
| Degree of Dispersion ($\overline{M}w/\overline{M}n$) | 1.24 | 1.24 | 1.29 |

EXAMPLES 26 TO 28

The cyclization reaction was carried out in the same method as in Example 3 except that the time of reaction was varied. Results are shown in Table 7.

TABLE 7

| Example | 26 | 27 | 28 |
|---|---|---|---|
| Time of Reaction (min.) | 20 | 40 | 120 |
| Degree of Cyclization (%) | 52 | 70 | 82 |
| Degree of Dispersion ($\overline{M}w/\overline{M}n$) | 1.29 | 1.31 | 1.32 |

EXAMPLES 29 TO 32

The cyclization reaction was carried out in the same method as in Example 3 except that toluene and xylene, in place of benzene, were used as reaction solvent. Results obtained are shown in Table 8.

TABLE 8

| Example | Solvent | Isoprene Polymer | | | | | Cyclized Polymer | |
| --- | --- | --- | --- | --- | --- | --- | --- | --- |
| | | Molecular Weight ($\times 10^4$) | Microstructure (%) | | | Degree of Dispersion ($\overline{Mw}/\overline{Mn}$) | Degree of Cyclization (%) | Degree of Dispersion ($\overline{Mw}/\overline{Mn}$) |
| | | | 1,4- | 3,4- | 1,2- | | | |
| 29 | Toluene | 7.2 | 94 | 4 | 2 | 1.05 | 69 | 1.37 |
| 30 | | 13.5 | 93 | 6 | 1 | 1.09 | 67 | 1.41 |
| 31 | Xylene | 7.6 | 93 | 4 | 3 | 1.04 | 68 | 1.34 |
| 32 | | 12.8 | 92 | 7 | 1 | 1.10 | 54 | 1.38 |

COMPARISON EXAMPLE 1

The polymer concentration of the solution of isoprene polymer prepared in Example 3 was adjusted to 2% by weight by adding benzene. To 100 ml of the solution were added in drops first 4 ml of a benzene solution of trichloroacetic acid (0.44 mol/l), then 4 ml of a benzene solution of diethyl aluminum chloride (0.44 mol/l) at 25° C. under a nitrogen atmosphere. After the addition the reaction was completed in 10 minutes. The reaction solution was poured into methanol to obtain a cyclized polymer. The GPC analysis of molecular weight distribution of the cyclized polymer proved formation of intermolecular reaction products in large amounts.

COMPARISON EXAMPLE 2

The same procedure as in Comparison Example 1 was followed except that 4 ml of a benzene solution of ethylaluminum dichloride (0.44 mol/l), in place of diethylaluminum chloride. Formation of a gel was observed when the ethylaluminum dichloride solution was added in drops.

COMPARISON EXAMPLE 3

The same procedure as in Comparison Example 1 was followed except that 50 μl of sulfuric acid (98% aqueous solution) was used in place of solutions of diethylaluminum chloride and trichloroacetic acid. A powdery product of polymer was obtained. The dispersion degree of the polymer as estimated by the same method as in Example 1 proved to be 2.54.

What we claim:

1. A process for producing a cyclized polymer of isoprene having a dispersion degree not greater than 2 as defined by the ratio of $\overline{Mw}/\overline{Mn}$, where $\overline{Mw}$ is the weight-average molecular weight and $\overline{Mn}$ is the number-average molecular weight, comprising:
   (a) polymerizing isoprene monomer in the presence of an organometallic compound expressed by the general formula RM, wherein R is an alkyl, aryl or aralkyl group and M is lithium, sodium or potassium; and
   (b) placing the thus obtained polymer in contact with a catalyst comprising a boron trifluoride diethyl-ether complex and a carboxylic acid of the general formula $Cl_{3-n}H_nCCOOH$, wherein n is an integer ranging from 0 to 3 to obtain the cyclized polymer.

2. The process of claim 1, wherein a solvent selected from the group consisting of hexane, cyclohexane, benzene, toluene and xylene, is used for the polymerization of isoprene monomers.

3. The process of claim 1, wherein the polymer prior to contacting the catalyst of step (b) has a dispersion degree not larger than 1.1 and a molecular weight not lower than 10,000.

4. The process of claim 1, wherein the carboxylic acid is selected from the group consisting of acetic acid, monochloro acetic acid, dichloroacetic acid and trichloroacetic acid.

5. The process of claim 1, wherein a solvent selected from the group consisting of benzene, toluene and xylene is used for cyclization of the polymer in step (b).

6. The process of claim 1, wherein the polymer to be cyclized in step (b) is present at a concentration ranging from 0.5 to 15 weight percent.

7. The process of claim 1, wherein the boron trifluoride diethyl-ether complex is present at a concentration ranging from 0.1 to 20 mole percent to the unit mole of the monomer.

8. The process of claim 1, wherein the carboxylic acid is present at a concentration ranging from 10 to 500 mole percent to the boron trifluoride diethyl-ether complex.

9. The process of claim 1, wherein the cyclization of the polymer in step (b) is done at a temperature of from 10° to 80° C.

10. A process for producing a cyclized polymer of isoprene having a dispersion degree not greater than 2 as defined by the ratio of $\overline{Mw}/\overline{Mn}$, wherein $\overline{Mw}$ is the weight-average molecular weight and $\overline{Mn}$ is the number-average molecular weight, comprising:
    (a) polymerizing isoprene monomer in the presence of an organometallic compound of the formula RM, wherein R is an alkyl, aryl or aralkyl group and M is lithium, sodium or potassium;
    (b) adding methanol or ethanol to the polymerization reaction system;
    (c) adjusting the concentration of the polymer to a range of from 0.5 to 15 weight percent; and
    (d) placing the thus obtained polymer in contact with a catalyst comprising a boron trifluoride diethyl-ether complex and a carboxylic acid of the formula $Cl_{3-n}H_nCCOOH$, wherein n is an integer ranging from 0 to 3, to obtain the cyclized polymer.

11. A cyclized polymer of isoprene for use as a negative resist, having:
    (a) a dispersion degree not greater than 2 as defined by the ratio of $\overline{Mw}/\overline{Mn}$, wherein $\overline{Mw}$ is the weight-average molecular weight and $\overline{Mn}$ is the number-average molecular weight; and
    (b) a cyclization rate of between 40 and 90%;
    said cyclized polymer being produced by a process comprising polymerizing isoprene monomer in the presence of an organometallic compound of the formula RM, wherein R is an alkyl, aryl or aralkyl group, and M is lithium, sodium or potassium, and placing the thus obtained polymer in contact with a catalyst comprising a boron trifluoride diethyl-ether complex and a carboxylic acid of the formula $Cl_{3-n}H_nCCOH$, wherein n is an integer ranging from 0 to 3 to obtain the cyclized polymer.

* * * * *